United States Patent
Gulbrandsen

(10) Patent No.: US 10,862,890 B2
(45) Date of Patent: Dec. 8, 2020

(54) METHOD AND SYSTEM RELATED TO AUTHENTICATION OF USERS FOR ACCESSING DATA NETWORKS

(71) Applicant: SGX AS, Oslo (NO)

(72) Inventor: Magnus Skraastad Gulbrandsen, Oslo (NO)

(73) Assignee: SGX AS, Oslo (NO)

( * ) Notice: Subject to any disclaimer, the term of this patent is extended or adjusted under 35 U.S.C. 154(b) by 0 days.

(21) Appl. No.: 14/902,811

(22) PCT Filed: Jul. 7, 2014

(86) PCT No.: PCT/NO2014/050123
§ 371 (c)(1),
(2) Date: Jan. 4, 2016

(87) PCT Pub. No.: WO2015/002545
PCT Pub. Date: Jan. 8, 2015

(65) Prior Publication Data
US 2016/0182519 A1    Jun. 23, 2016

(30) Foreign Application Priority Data
Jul. 5, 2013  (NO) .................................. 20130947

(51) Int. Cl.
*H04L 29/06* (2006.01)
*H04W 4/60* (2018.01)
(Continued)

(52) U.S. Cl.
CPC ............ *H04L 63/10* (2013.01); *G06F 16/951* (2019.01); *G06F 16/955* (2019.01);
(Continued)

(58) Field of Classification Search
CPC . H04L 63/0876; H04L 63/08; H04L 63/0853; H04L 63/10; H04L 2463/082;
(Continued)

(56) References Cited

U.S. PATENT DOCUMENTS 8,371,501 B1 * 2/2013 Hopkins ................. G06F 21/32
235/380
8,689,311 B2 * 4/2014 Blinn .................. H04L 63/0815
726/10

(Continued)

OTHER PUBLICATIONS

Umang Garg et al., "MAC and Logical addressing (A Review Study)", Journal of Engineering Research and Applications (IJERA), vol. 2, Issue 3, May-Jun. 2012, pp. 474-480 (Year: 2012).*

(Continued)

*Primary Examiner* — Catherine Thiaw
(74) *Attorney, Agent, or Firm* — Knobbe, Martens, Olson & Bear, LLP

(57) ABSTRACT

A system and method for authenticating a user that requests access to services of a computer network, including using a unique communication address for authentication and identification. One of the methods includes globally assigning unique communication addresses to users and devices, the devices being uniquely associated with respective users. Unique communication addresses associate with the users are used for authenticating and identifying the users. A login function is used through the devices, the devices each being mapped to a unique communication address using a hardware identity configured for sending and receiving information over a network.

10 Claims, 9 Drawing Sheets

(51) Int. Cl.

| | | |
|---|---|---|
| *G06F 16/951* | (2019.01) | |
| *G06F 16/955* | (2019.01) | |
| *G06F 21/12* | (2013.01) | |
| *H04W 12/06* | (2009.01) | |
| *H04W 4/24* | (2018.01) | |
| *H04L 9/32* | (2006.01) | |
| *H04M 15/00* | (2006.01) | |
| *H04W 12/08* | (2009.01) | |
| *H04L 12/14* | (2006.01) | |
| *H04W 12/00* | (2009.01) | |

(52) U.S. Cl.
CPC .......... *G06F 21/128* (2013.01); *H04L 9/3226* (2013.01); *H04L 63/08* (2013.01); *H04L 63/0853* (2013.01); *H04L 63/0876* (2013.01); *H04M 15/8214* (2013.01); *H04W 4/24* (2013.01); *H04W 4/60* (2018.02); *H04W 12/06* (2013.01); *H04W 12/0802* (2019.01); *H04L 12/1407* (2013.01); *H04L 12/1467* (2013.01); *H04L 63/0892* (2013.01); *H04L 2209/60* (2013.01); *H04L 2463/102* (2013.01); *H04W 12/00512* (2019.01); *H04W 12/00514* (2019.01)

(58) Field of Classification Search
CPC . H04L 2463/0892; H04L 12/06; H04L 12/08; H04L 12/1407; H04L 12/1467; H04L 2209/60; H04L 2463/102; G06F 21/31; G06F 21/45; G06F 17/30876; G06F 17/30864; G06F 21/128; H04W 4/60; H04W 4/24
See application file for complete search history.

(56) References Cited

U.S. PATENT DOCUMENTS

| | | | | |
|---|---|---|---|---|
| 8,984,605 | B2* | 3/2015 | Bauckman | H04L 51/24 726/7 |
| 2006/0015358 | A1* | 1/2006 | Chua | G06Q 20/02 705/44 |
| 2006/0111039 | A1* | 5/2006 | Whittington | H04B 3/36 455/8 |
| 2007/0209054 | A1* | 9/2007 | Cassanova | G06Q 10/10 725/100 |
| 2007/0232272 | A1* | 10/2007 | Gonsalves | H04W 8/22 455/412.1 |
| 2009/0158414 | A1* | 6/2009 | Chaudhry | H04L 9/3263 726/10 |
| 2009/0168735 | A1* | 7/2009 | Mizukoshi | H04W 12/10 370/338 |
| 2009/0206992 | A1* | 8/2009 | Giobbi | G06F 19/322 340/5.74 |
| 2009/0300744 | A1* | 12/2009 | Guo | H04L 63/0823 726/7 |
| 2010/0192199 | A1 | 7/2010 | Terry | |
| 2012/0054841 | A1* | 3/2012 | Schultz | G06F 21/44 726/6 |
| 2012/0066107 | A1* | 3/2012 | Grajetzki | G06Q 20/04 705/35 |
| 2012/0203594 | A1* | 8/2012 | Groer | G06Q 10/10 705/7.29 |
| 2013/0061332 | A1 | 3/2013 | Davis et al. | |
| 2013/0297933 | A1* | 11/2013 | Fiducia | H04L 63/0853 713/156 |
| 2015/0038120 | A1* | 2/2015 | Larkin | G06Q 20/3223 455/411 |

OTHER PUBLICATIONS

S. Cheshire et al., "Dynamic Configuration of IPv4 Link-Local Addresses", Network Working Group S. Cheshire Request for Comments: 3927, 2005, pp. 2-34 (Year: 2005).*

International Search Report and Written Opinion of the International Searching Authority for International Application PCT/NO2014/050123, dated Feb. 10, 2014, 12 pages.

Cuevas et al., The IMS Service Platform: A Solution for Next-Generation Network Operators to Be More than Bit Pipes, Advances in Service Platform Technologies for Next Generation Mobile Systems, IEEE Communications Magazine, Aug. 2006, 7 pages.

Schmid et al., An Access Control Architecture for Microcellular Wireless IPv6 Networks, Local Computer Networks, 2001, Proceedings LCN 2001, 26th Annual IEEE Conference Nov. 2001, 10 pages.

Koutsopoulou et al., A Platform for Charging, Billing, and Accounting in Future Mobile Networks, Computer Communications, Elsevier Science Publishers, Feb. 2007, vol. 30, Issue 3, 11 pages.

Murugesan et al., A Multipurpose Global Passport Solution Using IPv6, Computer Science and Information Technology (ICCSIT), 2010 3rd IEEE International Conference, Jul. 2010, 3 pages.

* cited by examiner

METHOD AND SYSTEM RELATED TO AUTHENTICATION OF USERS FOR ACCESSING DATA NETWORKS

CROSS-REFERENCE TO RELATED APPLICATIONS

Any and all applications for which a foreign or domestic priority claim is identified in the Application Data Sheet as filed with the present application are hereby incorporated by reference in their entirety under 37 CFR 1.57.

FIELD OF THE INVENTION

The present invention generally relates to data access by a user from a computer device, authentication of the user, and billing of a user granted access to the data. Data in this context does not include data that is publicly available, but only data to which access is restricted according to certain restrictions. More particularly, the present invention relates to a user authentication method and system. The invention also relates to a method of communication between a core network and a number of external units and restricted-access databases. The invention additionally relates to a platform for establishing and securing rights and prices as well as communicating such to the necessary parts of the core network.

PRIOR ART

The wide access individuals have to global computer networks has triggered a series of problems related to the authentication and authorization of the individuals. There are several problems associated with authentication, both security-related and practical, for users that are to authenticate themselves. The existence of several different authentication methods causes practical problems for the users as well as technical problems related to the communication between different restricted-access areas, clients, etc. There is a need for a universal identification and authentication system.

A variety of principles of authentication exists, such as single-factor, two-factor and three-factor authentication, to mention the three most common. In single-factor authentication, a user will authenticate himself using only one "credential", such as a mobile phone with a SIM card, for example, with the SIM card or mobile phone transmitting a unique hardware code, the hardware code being associated with a particular user. This type of authentication is not acceptable in cases for which high security is required, such as in transactions or download of rights-protected material, as it is essential that it is the actual registered owner of the SIM card or mobile phone that authenticates himself. In order to improve the security of authentication, it is common to introduce an additional element to be used in authentication so that two factors are used. Typically, the second element will be something a user remembers, i.e. one has a factor representing something a user possesses and a factor representing something a user remembers. The factor related to something a user remembers could be a PIN code, and in the case of manual authentication by phone it is typically an answer to a known question.

A problem with the factors used for authentication is their volatile nature; the "possession" factor and the "remembering" factor may both change and the remembering factor may also be forgotten. Unfortunately, no system exists in which one may identify oneself universally and independently of identification tools.

It is an object of the present invention to provide a system and method solving the above problem using volatile factors for authenticating users of services subject to security.

SUMMARY OF THE INVENTION

The object of the present invention is achieved by the methods and systems defined in the appended claims.

The invention uses the communication address needed for communicating in a computer network as an optional identifier together with any type of authentication (single-, two-, or three-factor) technique that authenticates that the user is in fact the appropriate user. If more than one factor are required, a hardware code/identity of an access device, for example, could be used as an additional factor. This is confirmed via a login function that creates/sends a key for/to the user and enables the user as authenticated in a login database configured for communication. This login database may communicate the key with the user and/or different access databases and/or access handlers of the actual network.

The invention allows users to use a communication address (IP) to identify themselves, providing a single sign-on, global, universal identification/authentication system useable for any access, payment and the like.

The use of IP addresses makes sure the appropriate user is behind a given communication address. It is an aim that the user shall not be able to access a core network and through this network gain access to restricted-access data without the user having been securely authorized through use of a unique user identity such as an assigned IP address, for example. According to an embodiment of the invention, the user may be rejected from the core network if authentication is not carried out using a unique identity as indicated above. In this manner the identity of a user may be associated directly with the rights of the user, and the user is prevented from gaining access to restricted-access data unless he authenticates himself.

Through the use of the invention, a user is prevented from communicating from an IP of an operator which does not have the same restrictions as the operator that has given the user access. Attempting to anonymize/not identify (e.g. proxy, hidden IP, using another IP) in order to access e.g. unlawful content or circumvent restrictions in a core network is not possible when using the invention, as the invention prevents access via the network for a user. The invention prevents users from accessing global networks via the infrastructure of other operators than the access operator.

According to an aspect of the invention, a method of authenticating a user requesting access to services of a computer network comprising using a unique communication address for authentication and identification is provided. The method may also comprise a global allocation of unique communication addresses to users and devices. The method may further comprise using a login function via an apparatus or device to which can be associated a unique communication address, such as an IPv6 address via a hardware identity such as MAC, IMEI IMSI and the like, configured for sending and receiving information over a network. The method of the invention may comprise using the hardware identity, i.e. an identifier being at least one of the communication address, MAC, IMEI, a code, Banking Id, or another means of identification that can be used for authenticating a user.

The method may further comprise sending, if one of the identifiers is lost or the user logs out, a signal to the database that keeps a record of the users and whether they are authorized, said database being configured to make sure that the user in question gets access to the computer network or that such user is removed from the computer network when an identifier is missing. According to the method, the database may be configured for registering that the user is no longer in possession of all identifiers, as well as for communicating information thereon during subsequent request from access databases or other external units based on the user's request for access thereto. According to an embodiment of the invention, the database may be part of a subscription system administrating users at a telephone company.

The invention also comprises a system for authenticating a user that requests access to services in a computer network, comprising the use of unique communication addresses for authentication and identification. According to this system, the system may comprise a global allocation of unique communication addresses to users and devices.

The system may further comprise a login system and a subscription system able to communicate with at least one of the following: (a) various access databases, (b) access handler, (c) key at the user, (d) any other electronic requests such as authentication for purchase, signing, reconciliation, and other external units, etc.

According to a further aspect of the invention, a method of communication between a core network and a number of external units as well as access databases (ADB's) protecting restricted-access data, services, information, systems, applications, etc. is provided, comprising: communicating identification of users that have access and which access they have, and determining and communicating, by the core net, on request, whether or not the user has paid/shall be allowed credit for the supposed usage (subscription system/billing). The method may comprise registering traffic with the core net and/or with the ADB that informs the core net.

According to a further aspect of the invention, a system for communication between a core network and a number of external units as well as access databases protecting restricted-access data, services, information, systems, applications, etc. is provided, comprising: that identification of users that have access and which access they have is communicated, and that the core net, on request, determines and communicates whether or not the user has paid/shall be allowed credit for the supposed usage (subscription system/billing). The system may comprise registering traffic with the core net and/or with the ADB that informs the core net.

According to a still further aspect of the invention, there is provided a method of communication between a core network and a digital platform that provides information on the content, form of payment, terms of use, price, distribution of the price/revenues to the proper entities, and the functions of the core network (subscription, billing, blocking, other external communication, payment to other parties).

According to a yet still further aspect of the invention, there is provided a system for communication between a core network and a digital platform that provides information on the content, form of payment, terms of use, price, distribution of price/revenues to the roper entities, and the functions of the core network (subscription, billing, blocking, other external communication, payment to other parties).

Further features and advantages of the present invention will be apparent from the accompanying dependent claims.

BRIEF DESCRIPTION OF THE DRAWINGS

In the following, a brief description of the drawings is provided to facilitate the understanding of the invention. The detailed description that follows references the attached drawings, in which.

DETAILED DESCRIPTION OF THE INVENTION

Figure 1:
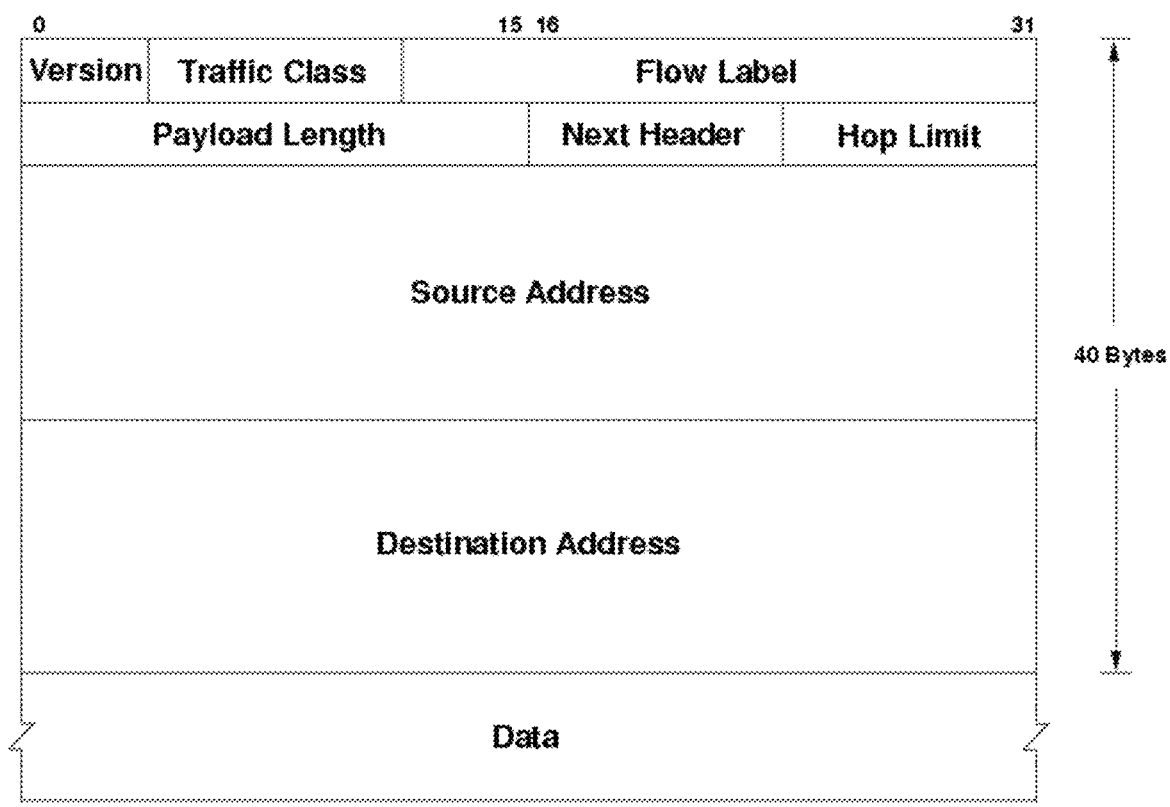
FIG. 1 shows an IPv6 packet header.
Figure 2:
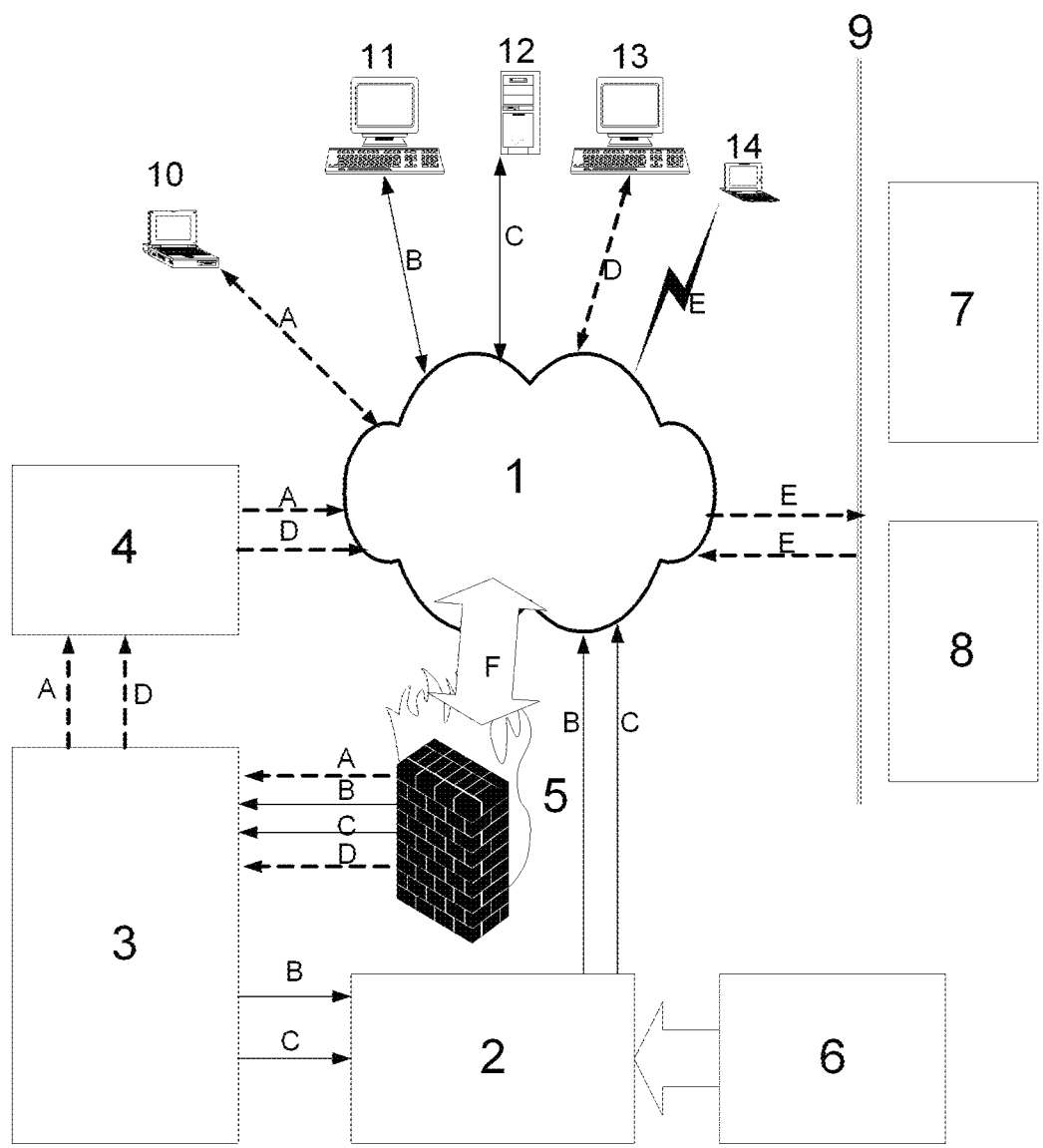
FIG. 2 shows a network including databases comprising content that requires authentication for access.
Figure 3:
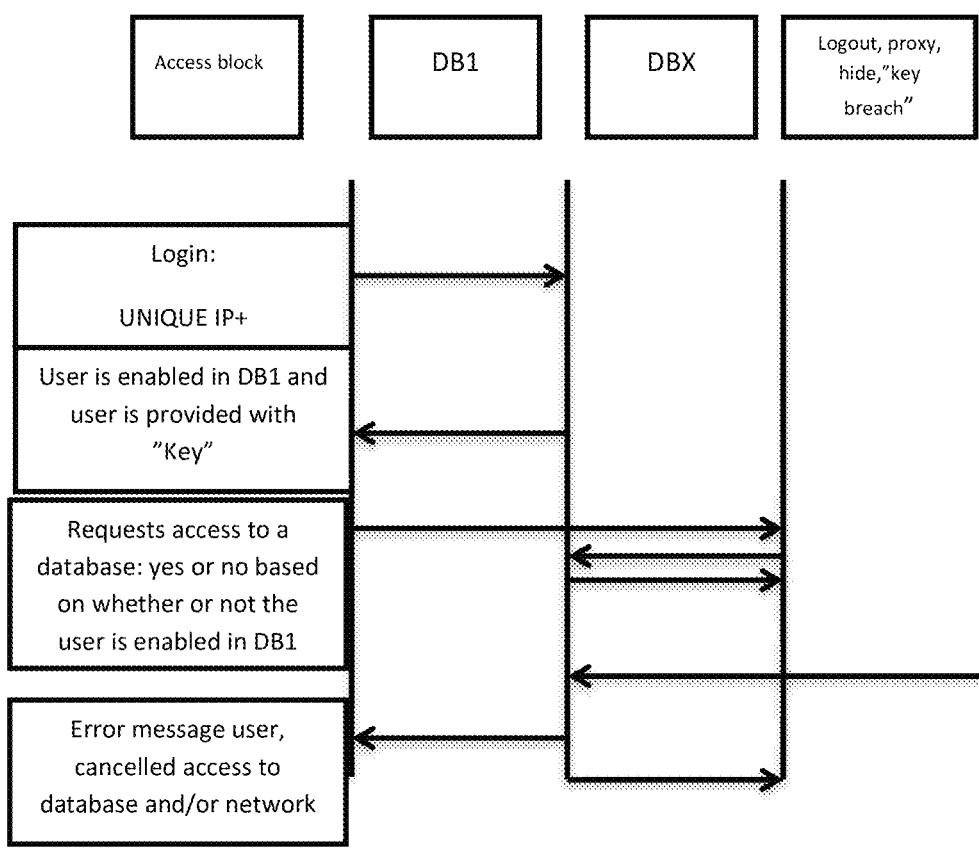
FIG. 3 shows a diagram of a sign-on/login routine of authentication according to an embodiment of the present invention.

In the following, first general embodiments in accordance with the present invention are described and then specific exemplary embodiments will be described. Where possible, reference will be made to the attached drawings and if possible using the reference numerals of the drawings. It should be noted, however, that the drawings shows only exemplary embodiments and other details and embodiments may also be within the scope of the invention as described.

By the term restricted-access data shall be understood any material, systems, services, applications, programs, video, audio and the like being protected under copyright laws and other laws, and the term shall also include data being protected through private law agreements, such as license agreements, distribution agreements, agency agreements and the like, as well as data to which an owner chooses to apply access restrictions regardless of rights and legal framework. As the invention is directed to access control of restricted-access data over computer networks, the term restricted-access data will not encompass material of a tangible nature. However, the term encompasses any digital interpretation or rendering of copyright protected tangible material. Such tangible material may comprise, but is not limited to, photographs, paintings but also sculptures and other tree-dimensional material of which the digital interpretation can be used for the production and exploitation of tree-dimensional material, for example.

The term telephone company, in the context of the invention, shall include any network access provider having the right to mediate data traffic to and from a user and that at the same time is able to communicate restricted-access data directly or indirectly to one or more users.

By rights holders is meant one or more entities lawfully in possession of the right to restricted-access data and services. For the cases in which a telephone company offers its own restricted-access data material and services the telephone company may also be a rights holder. Such material may be, for example, computer software platforms or applications, where computers shall be interpreted in accordance with the definition provided herein.

By rights providers is meant one or more entities which may lawfully mediate restricted-access data. A telephone company may be a rights provider.

By computers shall be understood any device that is able to connect to a computer network and that at the same time can be identified by a unique identity. The unique identity may be associated with the device as a hardware identity such as a MAC address, IMSI or IMEI identities, for example. In an embodiment of the invention, a computer is directly mapped to the identity of a user, with the identity of the user being unique and assigned by a telephone company or a certification body.

By a core network 1 shall be understood the network of a telephone company or service provider which is the traffic carrier for users outside the operator itself; in some domains this is also referred to as the backbone network.

IP, by IP is meant the Internet Protocol, which is an Internet protocol on the network layer. Several internet protocols exist on the network layer, with the most common being IPv4. IPv4 has been in use for a long time and one of the fundamental problems therewith is the limitation on the number of available addresses. The increase in the number of devices requiring separate IP addresses has been explosive and IPv4 is running out of addresses within some address ranges. Another weakness which can also be attributed to the fact that IPv4 is about to become obsolete is that this protocol does not scale very well with respect to increased demands for authentication, data integrity and data security, with the increased demands being caused largely by the enormous number of transactions that is presently available on the "net", both monetary transactions and, not the least, transactions of rights-protected material such as games, music, films, and books. In order to overcome the deficiencies of IPv4, already in 1994 transition to a protocol having a larger address range and greater flexibility in general was suggested, which protocol was referred to as IPv6. IPv6 has an address space of 128 bits whereas IPv4 has only 32 bits.

In many contexts, IPv6 addresses are divided into two parts, a 64-bit network prefix and a 64-bit part addressing the host. The last part, being the interface identifier, will often be generated automatically from the MAC address of the network adapter. A MAC address includes 48 bits, and transformation from 48 bits to 64 bits for use as an interface identifier is described in 2.5.1 of RFC 4291. IPv6 addresses are typically specified hexadecimally as eight groups of four hexadecimal digits separated by a colon.

An IPv6 packet is comprised of two parts, a header as shown in FIG. 1, and the payload. The header comprises the 40 first characters of a packet and contains various fields. In the context of the present invention, it is primarily the Source address field of the header that is of interest, which contains the source addresses.

Like IPv4, IPv6 supports globally unique IP addresses so that the network activity of any device may be tracked (at least theoretically).

It is a purpose of IPv6 to assign unique addresses to each device existing on the "net." Hence, each device on the Internet will have a unique, global address directly addressable from any other address on the Internet. The need for saving addresses in IPv4 has lead to the introduction of a network address translation (NAT) that has masked devices having IP addresses situated behind a network interface so that such devices has not been straightforwardly recognizable from outside the network interface. In IPv6, it is not necessary to use NAT or address auto-configuration, although auto-configuration based on MAC address is possible. Even when an address is not based on a MAC address, the interface address will be globally unique as opposed to what is seen in NAT masked IPv4 networks. Even though the IPv6 regime may be criticised for compromising "privacy", its characteristics in the form the large address space and unique trackability makes it an interesting candidate for authentication.

According to the present invention, it is an object to provide authentication systems and authentication methods wherein a factor is based on the communication address (such as IPv6). As indicated above, it is common to use a MAC address, IMSI or IMEI identity as one of the factors that generates an authentication code. Also as indicated, however, there are several drawbacks associated with this approach. For example, a hardware unit (the possession factor) may be used by several users. If users are assigned a globally unique address that is invariable in the same manner as a social security number/telephone number, then such an address could be used as a factor in an authentication algorithm, whether a "one-factor, two-factor or three-factor algorithm." Such unique address may be an IPv6 address.

IPv6 addresses may be assigned from ISPs, operators, or certified parties entitled to hand out certificates, as it is known from the current systems in which individual actors such as Symantec, among others, can verify authenticity, hand out PKIs in the capacity of being Certificate Authorities (CAs). Assignment of the IPv6 address is assumed to be carried out in a secure manner.

After individuals have received a personal and globally unique IPv6 address, according to an aspect of the invention, the user will be able to authenticate using this unique IPv6 address in a one-factor authentication system.

According to another aspect of the invention, the unique IPv6 address may constitute one of the factors in a two-factor authentication, wherein the other factor may be a MAC address, IMSI or IMEI code. The hardware code and IPv6 address, according to an aspect of the invention, may be the input to an algorithm that generates a unique authentication code.

Similarly, according to a third aspect of the invention, three factors may be used.

If a user is to carry out transactions or perform other actions for which certainty of a person's identity is required, then authentication will be necessary.

ID+IP=verified/enabled/identified IP—specified through a login function—warning and automatic disabling if identification is lost/key is "destroyed." Cancelling/disabling of access to the network and/or to a protected resource. (if you are not identified at all times, you are disconnected)

According to an embodiment of the invention (FIG. 4), the invention comprises a sign-on/login function for accessing the Internet/another network.

The sign-on function, when a two-factor solution is employed, communicates with a database keeping a record of the communication addresses and identities behind the different communication addresses and how the identities can be authenticated (DB1). An electronic device including a transmitter and receiver having a communication interface allowing it to have a communication address with which it can communicate on the net (IMEI, IMSI MAC) can be used.

Figure 4:
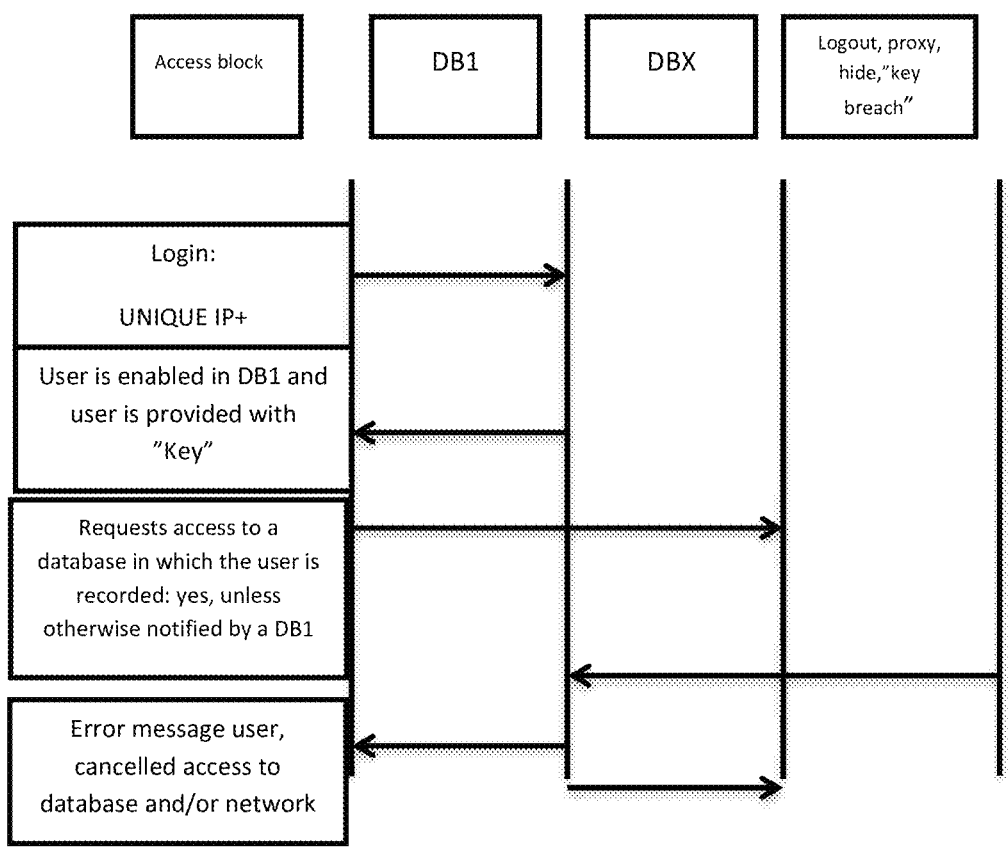
FIG. 4 shows a diagram of a sign-on/login routine of authentication according to a variant of the embodiment shown in FIG. 3.

The communication address can be listed in various access databases (DBx) connected to a computer network and protecting a URL, link, or a particular data volume, a service or other restricted-access material. The access a DBx is decided by whether the communication address is found in the access database, and that a request is passed back to DB1 regarding whether it finds that the address is enabled/authorised by the correct user, in which case access it given to DBx. In the opposite case, an error message is sent and access is denied. If the user logs out or the "key" is breached this may be reported to DB1, which sends a message to the relevant access databases (DBx) and other external units informing that the user shall no longer have access and an error message is sent. In this case, it can be distinguished between an intended logout and a disruption because the key is breached; by distinguishing between key breach and logout, the amount of data traffic can be reduced, as intended logout does not necessarily need to be reported to DB1 since then in any case only the correct user is able to log back on. In the case of key breach, a report is always sent to DB1. DB1 registers this and may send a message to a DBx and other external units informing that the user is not identified. Any subsequent access attempts by the user/communication address will then be denied and an error message is given at the ADB (FIG. 4).

The access restriction may be connected directly to the access handling in which a user is given access while he at the same time enables/authenticates his user in DB1. Enabling occurs when correct ID and correct IP are provided together with a mac, imei, or the like. A key is created at the user. This key notifies DB1 if it is breached in that the IP is changed/hidden/anonymized or the user logs out. DB1 notifies the access handler, which delivers an error message to the user.

A First Exemplary Implementation of an Aspect of the Invention:

In the following, an exemplary use of authentication in the case of communication between a core network and a number of external units and restricted-access databases is provided. The example includes five steps:

1. A subscriber of a telephone company has a unique communication address and uses a login function to enter the communication address and an authentication tool that proves that he is in fact the appropriate user of the communication address. The code with which the computing devices (computer, tablet and mobile phone) of the user are tagged is also provided. When everything checks out, it is registered in the subscription system of the operator that the user has been identified, and the user is assigned a key.

The user tries to access a database having a service or content. If the firewall does not recognise the communication address, then access is not granted. If the firewall recognises the communication address, then access is granted.

2. If a logout/key breach is registered by the subscription system (DB1), then is may notify the ADB and external units.

3. If a user that is logged in and identified logs out or changes IP through a proxy server, hides the IP by way of other software, uses multiple IPs and the like, a message is passed from the key to the subscription function that registers a key breach.

4. If a user acts in a manner that leads to a key violation or logout, then this information can be communicated to access databases. The user will then no longer be allowed access to the databases in question.

5. Information on logout/key breach may be communicated directly to the access function associated with a core network and terminate the access of the user in question.

6. A server/database handling a purchase, a signing function, finance function, or the like may receive a message informing that the user is not identified.

7.

An Exemplary Implementation of a Second Aspect of the Invention

Figure 5:
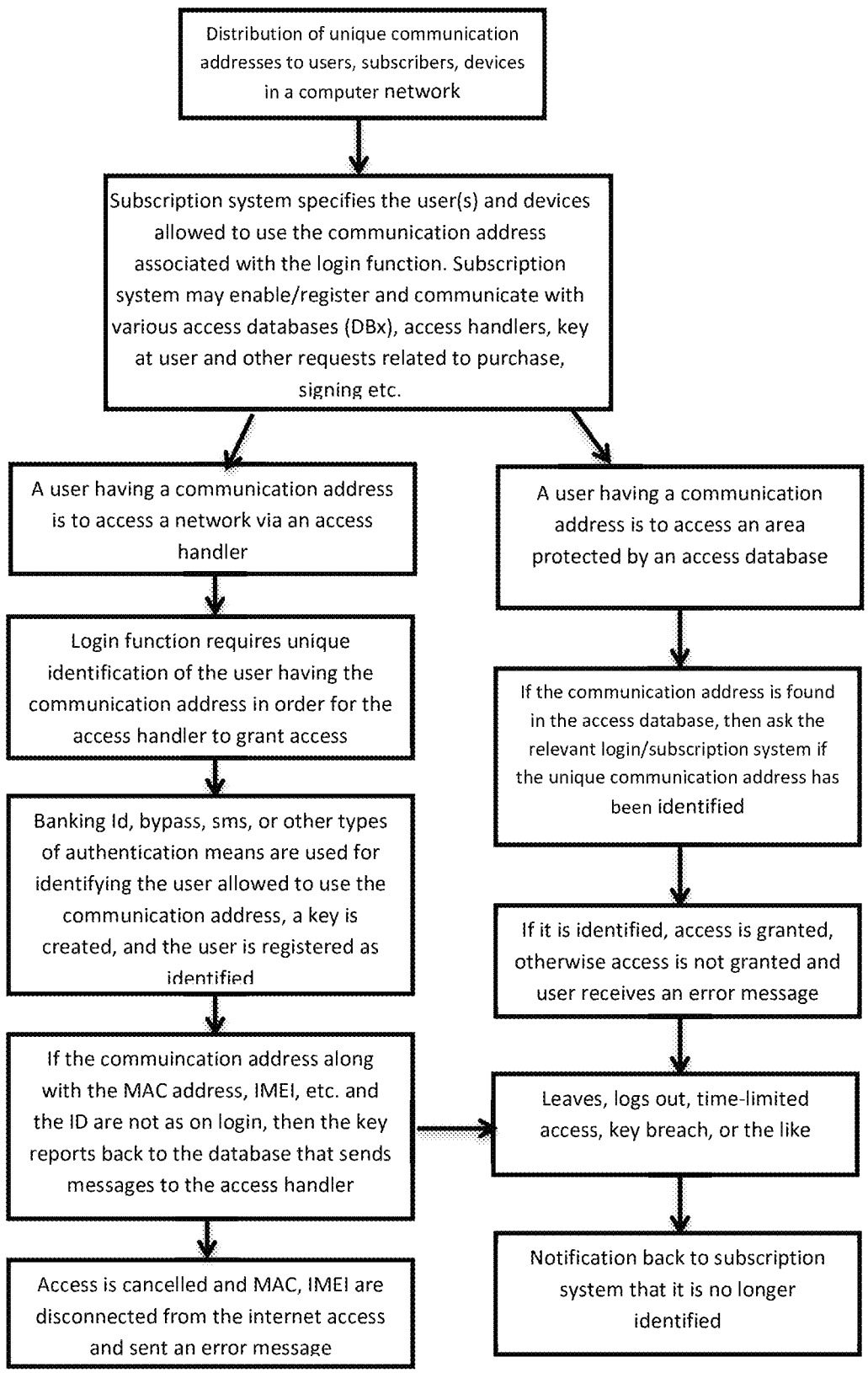
FIG. 5 shows a flow diagram describing a method of authentication.

The invention also relates to a platform for establishing and securing rights and prices as well as communicating such to the necessary parts of the core network, which is discussed in this example with reference to FIG. 5.

Communication between the access database/firewall (ADB) protecting content/a service/data and connected to a computer network and a core network (CN) including a client and subscription system (CSS) and a billing system (BS). The core network provides information on which clients shall be allowed access and which access is to be allowed. When a relevant access is requested by a unique user, the ADB is consulted to see if access shall be granted. (It is assumed that the use specified has been paid for/that credit shall be allowed). The ADB also checks if the client has paid or shall be allowed credit by inquiring the core network. If access is granted, such access takes place within the agreed limits for the usage. The ADB registers the traffic and may report back to the core network.

1. The CCS registers who the clients are and to what they choose to have access in a directory per user. The clients are given access to the relevant ADBs in that their unique ID with the directory is listed.
2. The BS bills clients according to what shall be paid for the access specified. The BS receives information on prices as well as supposed and/or registered traffic. The CN communicates with a number of ADBs and external units.
3. Internally in the core network, the billing system and client system communicates and reconciles. Information on traffic registered for a client can be retrieved from the different ADBs.
4. When access is attempted, the ADB determines whether the client shall be allowed access, and possibly which access (Mapping); whether or not payment has been made is checked with the core network, BS, CCS.
5. Access is granted if the client and the access in question are listed in the ADB, unless the ADB has registered info from the CN that the user has not paid or shall not be allowed credit.
6. The ADB registers traffic and may then report back to the CN. The CN may also register the use.

The client specifies for the CN selected content and services and the scope of use, the CN provides information to the BS/CN enter the user in different ADBs together with the scope of use (Mapping)/CN gives notification and the client becomes disabled in the ADB if he has neither paid nor shall be allowed credit (cash purchase, for example, may still be authorized (enabled/disabled in the ADB for different actions)) or alternatively the ADB asks the CN whether the client has paid or has been allowed credit for e.g. individual purchases outside the mapping (enabled/disabled in ADB for different actions)

Access Request from a User:

Does the user exist in ADB? (is the service a part of the user's subscription ? This may also be checked with the CCS)

Which type of use ? For example, are there any more downloads left ? (mapping and registering) Unless the ADB has been notified by the CN, it is assumed that the client has paid or shall be allowed credit. (Or may pay cash) (enabled/disabled in the CN)

Has payment been received ? Or has credit been given ? Or is it paid cash ? (enabled/disabled in the CN)

Reports back to CN if there is further activity that shall be billed.

ADB registers and provides information to the CN

The core net, using information on the user and the agreed use (subscription, predetermined "Mapping"), creates a user profile based on such information at the ADB and communicates with the ADB regarding the different services in order to, at any given time, decide access and to invoice correctly based on the actual use (registration, in arrears if credit has been granted)

Clients select access. Their IDs are registered at the relevant access locations (ADBs). The client billed accordingly. When access is requested, it is checked whether the client has been entered, and whether payment has been made/credit has been given. If access is granted according to specifications, then the use made by the client is registered. This information may be sent to the CN.

The invention according to this example solves the following problems.

Messages to the different ADBs informing on who shall have access to what.

No simple payment solution exists that is platform-independent and that can be used on the net.

Problems with excessive signalling caused by real-time checking of whether the client has paid. How can one assume that a user has paid until the opposite has been notified by the CN.

On request from a user, find out if individual users have paid/shall be allowed credit/must pay cash, and for which use?

The usage registration in the core net or with the ADB (the ADB can more easily interpret the usage) is communicated to the entity that bills the unique client/user.

An exemplary practical implementation according to an aspect of a second exemplary embodiment of the invention.

A unique user, through a subscription system, shall select access to various data and content services.

A core network including the subscription system notifies the different ADBs and external units that a user shall be allowed access and which accesses are to be mapped to the client.

The user then attempts to access the content services he has ordered. These are located behind a firewall of an ADB.

If the material requested in the request is found in the supposed usage, then access is granted, otherwise access is not granted. This may also relate to the right to cash purchase and allowance of credit. The ADB may ask the core network (billing system) whether or not the client has paid/shall be allowed credit and access is granted in accordance with the supposed usage. The use is registered in the ADB and the use may be reported back to the core network. The core network may also register use.

The invention, according to the second aspect of an embodiment of the invention, includes:

Communication between a core network and a number of external units and access databases protecting restricted-access data, services, information, systems, applications, etc. A cash purchase order function may also be protected.

Deciding which use shall be allowed and whether or not the user has paid/shall be allowed credit for the supposed usage. The CN (subscription function, billing function) notifies the ADBs/external units if a user neither has paid nor shall be allowed credit. This may be registered in the ADB and prevent subsequent access requests from the user in question.

Registering traffic with the core net and/or with the ADB which reports to the core net.

An Exemplary Implementation of a Third Aspect of the Invention

An exemplary embodiment of a third aspect by the invention will be discussed with reference to FIG. 6.

The invention relates to a platform for establishing and securing rights and access criteria such as prices, for example, as well as communicating such to the necessary parts of the core network (WHAT IS THE PRICE ? WHAT IS RIGHTS PROTECTED AND SHALL BE BLOCKED? WHAT IS THE PERCENTAGE ACCORDING TO WHICH THE REVENUES SHALL BE DISTRIBUTED ?) comments to billing, subscription, blocking, registering, external communication.

An electronic platform with login function. The platform allows the possibility to specify terms associated with rights to digital content/services and data which by the rights owner have been designated as access-restricted. Such terms may be, for example, price, country, and geography, operator, a particular distribution of the payments from the users, etc. This may be accepted by another party and the terms and price as well as the distribution of the revenues from the content/services specified determines how the CN handles billing of clients, blocking of the user's access to unlawful, similar data, and the distribution of revenues. The platform/database communicates with a core network and may provide information needed by the CN. Prices on different services/content, how payment shall be made, and which distribution key shall apply are implemented in the billing and client system, as well as in relation to blocking functionality of unlawful material. The payment is distributed according to the distribution percent of the platform for the service/content in question.

Login, terms, counterparty confirmation, price specified, percentual distribution of the price/revenues, functions for blocking unlawful data. Information is directed to the subscription function, billing system, blocking function, and the cash flow management.

The invention provides a platform for initiating, administering and implementing digital rights agreements which reports to the core network information necessary for the functionality needed. This is not provided by prior art.

A practical example of an implementation according to the third exemplary aspect of an embodiment of the invention.

1. A digital platform. An agreement party logs in and accepts the terms. When confirmation is given by a "counterparty", information is sent to the core network. Which content/services can be selected by the user, the applicable country or region, what is the price and thus what the user is billed, how the payment shall be distributed, what is similar content that is unlawful and shall be blocked.

2. An operator and a rights owner make an agreement that is duplicated in the platform. The rights owner, based on the traffic he registers from the clients of the operator, will collect payment accordingly from the operator in accordance with the agreement. The operator will then make sure he gets paid by the end client, to make cover for the payment he has committed to towards the rights owner.

Hence, the invention according to the third aspect provides:

Communication between a core network and a digital platform providing information on the content, price, distribution of the price to the correct entities, and the functions of the core network (subscription, billing, blocking, payment)

Figure 6:
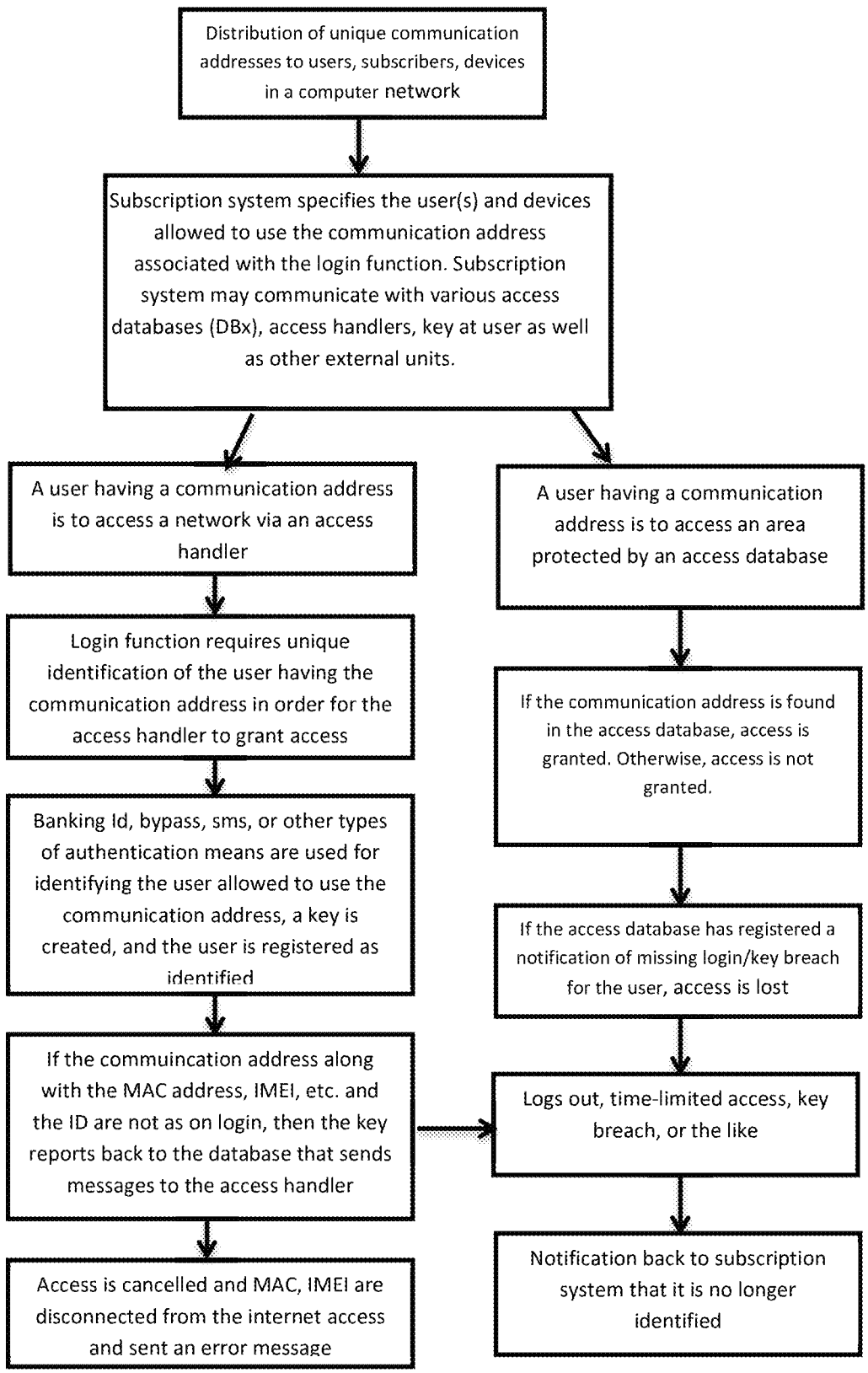
FIG. 6 shows a flow diagram describing an alternative method of authentication to the one shown in FIG. 5.
Figure 7:
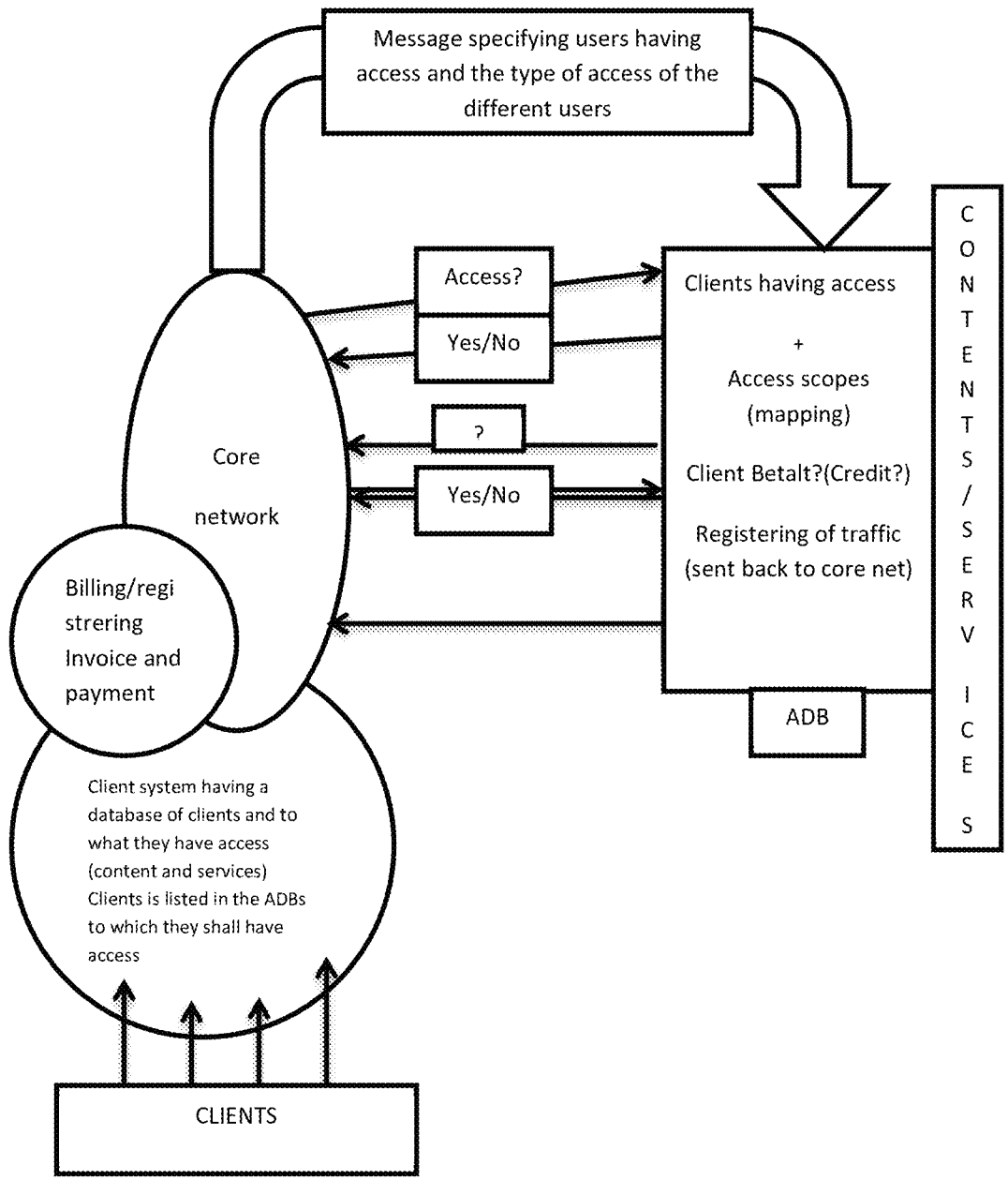
FIG. 7 shows exemplary communication between a core network and a number of external units and access databases protecting restricted-access data.
Figure 8:
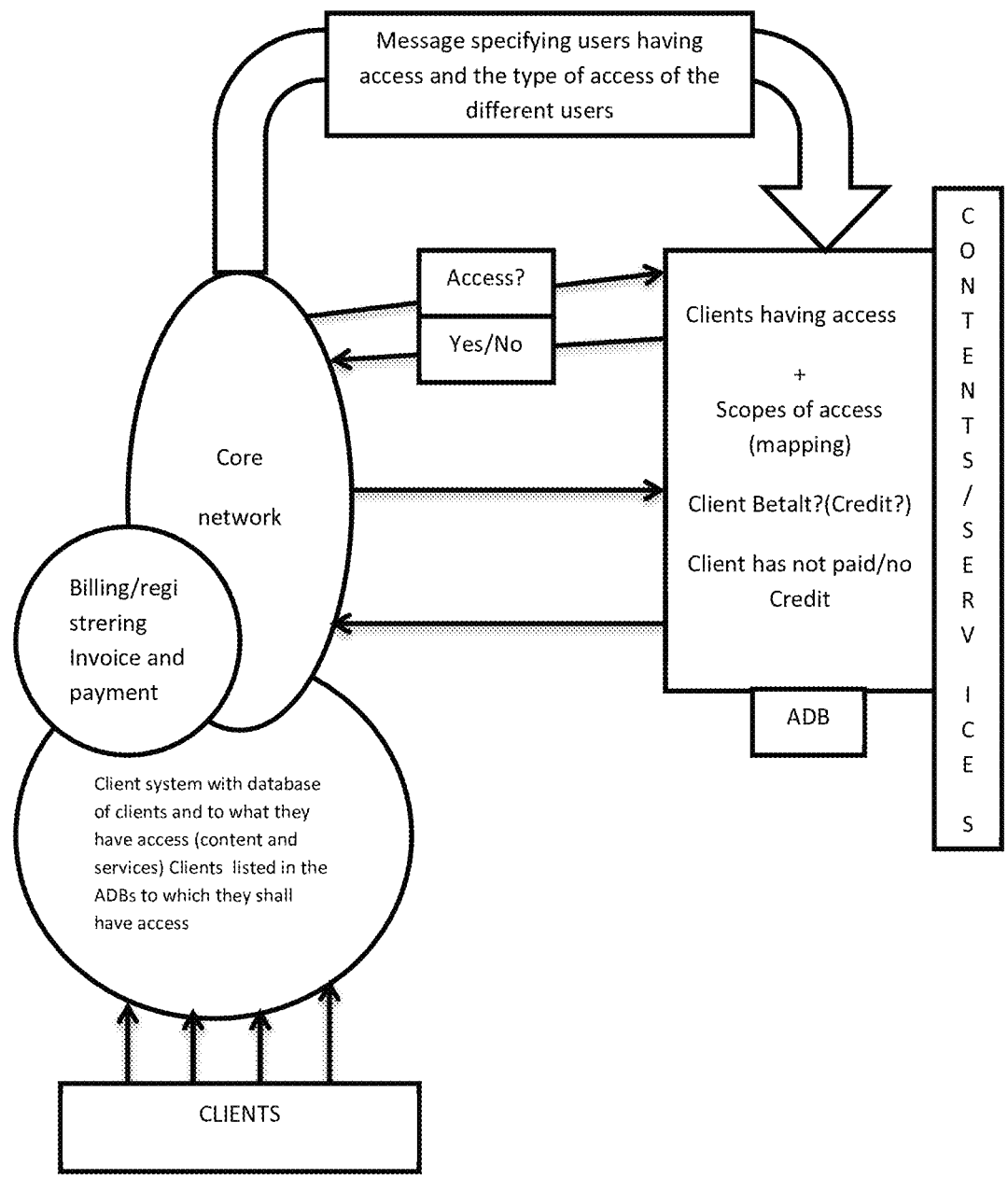
FIG. 8 shows an alternative example for the communication of FIG. 7.
Figure 9:
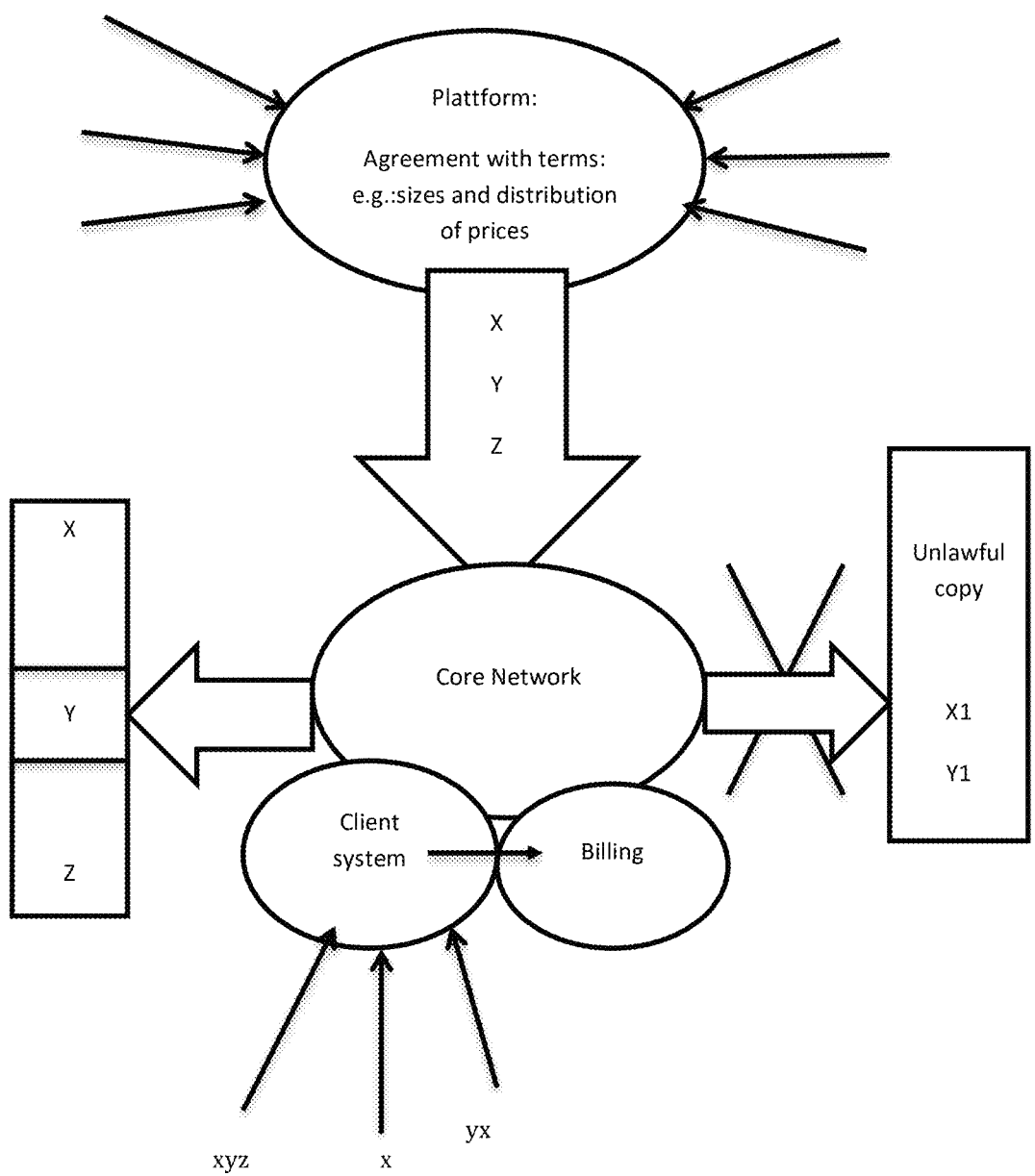
FIG. 9 shows an exemplary platform for interaction between the core network and billing systems.

FIG. 6 shows a platform comprising agreements with various terms of distribution and end-client use, e.g. regarding price to the end client and the distribution of revenues between the rights owner and distributors, the interaction of the platform with the core network, and interactions between the core network and billing systems, payment systems, and lawful versions. Access to unlawful copies of the protected data is prevented.

List of Definitions

| | |
|---|---|
| 1 | A core network operated by one or more telephone companies |
| 2, ADB, DBx | A database comprising data that has been chosen by a rights owner to be access-restricted, the database including interfaces for communication with several external units. |
| 3, DB1 | A database that comprises information on access rights for individual identities and that is provided with an interface for communicating with external units. |
| 4 | Database/server comprising data for error messages, the error messages being associated with requests from unique identities that have been rejected by the database (3). |
| 5 | An access handler provided with a communication interface for receiving data from the core network (1) as well as a communication interface for communicating with the database (3) |
| 6 | Specifies one or more providers of data material, of which at least some is copyright protected |
| 7 | A database that comprises copyright protected material stored without the consent from the rights owner(s). |
| 8 | A database that comprises copyright protected material stored without consent from the rights owner(s). |
| 9 | Denotes a "symbolic" barrier for an operator that allows the operator to prevent access to certain databases/addresses (7, 8) with a request to access copyright protected material that has been stored in defiance with the rights owner(s). |
| 10-14 | Exemplary computers, which computers are assigned a fixed, unique identity. |
| A-E | Denotes communication paths established by the computers (10-14). |
| DBx | Access database(s) |
| ADB | Access database(s) |
| IMEI | International Mobile Station Equipment Identity, is a hardware number for identifying 3GPP or iDEN mobile phones such as GSM (Global System for Mobile Communications), UMTS (Universal Mobile Telecommunications System), and LTE (long-term evolution) and some satellite phones. |
| IMSI | International Mobile Subscriber Identity, used for identifying a user in a cellular network; in a GSM, UMTS and LTE network the code is assigned to the SIM card whereas in CDMA-2000 networks, the code is assigned directly by phone or in a R-UIM card (Analogue-to-SIM card) |
| MAC address | Media Access Control address |
| LAN | Local Area Network, a local network for network connections between devices configured to connect to networks, wirelessly or cabled. Examples of such devices may be computers, printers, mobile phones, PDAs, etc. |
| LAN MAC | Local Area Network Media Access Protocol, MAC is a unique hardwired address given to all devices configured to connect to networks, wirelessly or cabled. |
| PDA | Personal Digital Assistant |
| IP | Internet Protocol, the most important protocol on which the Internet is based. |
| IPv4 | Internet Protocol version 4 is a fundamental protocol on which the Internet is based. The address field is based on 32 bits. |
| IPv6 | Internet Protocol version 6, is a protocol for the Internet. The address field is based on 128 bits, providing, in principle, for $2^{128}$ possible address combinations. The IPv6 standard includes auto-configuration, meaning that a device may assign itself an own, unique address, the address being based on the LAN MAC address of the device. |
| MPLS | Multi Protocol Label Switching; this is a protocol by which IP networks may carry out forwarding decisions based on addresses (labels) so that data packets are forwarded from one network node to the next based on short addresses (labels) instead of lengthy network addresses so that complex routing table lookups can be avoided. |
| HTTP | Hyper Text Transfer Protocol, protocol for transferring hypertext. |
| HTTPS | A secure version of HTTP adapted for authentication and encrypted transfer, actually HTTP over SSL or TLS |
| FTP | File Transfer Protocol, hence a file transfer protocol, is an operating system independent protocol for transferring files in a TCP/IP based network. It only operates on TCP. |
| TCP | Transmission Control Protocol is a network protocol for connection-oriented, reliable transfer of information, and operates on the transport layer of the OSI computer networking model. |
| UDP | User Datagram Protocol is a message oriented network protocol for the connectionless transfer of information, and operates on the transport layer of the OSI computer networking model. Provides no delivery guarantees, requires less overhead than TCP, and is suitable, for example, for the transfer of real-time data, wherein it is better to discard messages than "delaying" the transfer. |
| SSL | Secure Socket Layer protocol |
| TLS | Transport Layer Security protocol |
| SSH | Secure Shell is a computer program and a network protocol on the application layer, that is, the upper layer of the OSI model. All traffic between the SSH client and server is encrypted. |
| URL | Uniform Resource Locator |

What is claimed is:

1. A method of authenticating users requesting access to restricted-access data or services in a computer network via an access database, the computer network comprising at least one core network, wherein the core network comprises a network of an access provider which can communicate with a plurality of access databases connected to the computer network, and the method comprising:
   globally assigning a plurality of unique communication addresses to a plurality of devices in the computer network, each device being uniquely associated with a respective user,
   using an assigned unique communication address associated with a user of a device as at least one identifier of the user,
   using a login function through the device of the user to authenticate the user at a first access database (DB1) in the computer network using the at least one identifier of the user and generating a key comprising a unique user authentication code to register at the first access database (DB1) the user as being authenticated to access the computer network;
   receiving at a second access database (DBx) in the computer network a request by the user to access the second access database (DBx) having restricted-access data or services;
   if the communication address of the user is listed in the second access database (DBx) and the user is registered as authenticated to access the computer network at the first access database (DB1), granting access to the user to the second access database (DBx); and
   if the first access database (DB1) registers that the key is breached, terminating access to the user to the second access database (DBx).

2. The method of claim 1, wherein the devices are assigned a unique communication address using a hardware identity which enables a device to send and receive information over a network.

3. The method of claim 2 further comprising using the hardware identity as a further identifier of the user for authentication.

4. The method of claim 2, wherein the hardware identity comprises one of: Media Access Control (MAC) address, International Mobile Station Equipment Identity (IMEI), or International Mobile Subscriber Identity (IMSI).

5. The method of claim 1, wherein, in the case that one of the at least one identifier of the user is not present or that the user logs out through their device, the method further comprises:

sending from the user an automatic message to the first access database (DB1), the first access database (DB1) being configured to remove the user from the computer network.

6. The method of claim 5, wherein the first access database (DB1) is configured to register that the user is no longer in possession of one of the at least one identifier of the user, and to communicate information thereon automatically to access databases (DBx) or during subsequent requests from other access databases or other external units on the network based on the user's request for access and communication thereto.

7. The method of claim 1, wherein the first access database (DB1) is part of a subscription system administering users of a telephone company.

8. The method of claim 1, further comprising using a unique user identification means as a further identifier of the user for authentication.

9. The method of claim 8, wherein the unique user identification means comprises a code or a Banking ID.

10. A system for authenticating users requesting access to restricted-access data or services in a computer network via an access database, the computer network comprising at least one core network, wherein the core network comprises a network of an access provider which can communicate with a plurality of access databases connected to the computer network, wherein the system performs a method comprising:

globally assigning unique communication addresses to a plurality of devices in the computer network, each device being uniquely associated with a particular user;

using an assigned unique communication address associated with a user of a device as at least one identifier of the user;

using a login function through the device of the user to authenticate the user at a first access database (DB1) in the computer network using the at least one identifier of the user and generate a key comprising a unique user authentication code to register at the first access database (DB1) the user as being authenticated to access the computer network;

receiving at a second access database (DBx) in the computer network a request by the user to access the second access database (DBx) having restricted-access data or services;

if the communication address of the user is listed in the second access database (DBx) and the user is registered as authenticated to access the computer network at the first access database (DB1), granting access to the user to the second access database (DBx); and if the first access database (DB1) registers that the key is breached terminating access to the user to the second access database (DBx).

* * * * *